United States Patent [19]

Aoyagi et al.

[11] Patent Number: 5,796,555
[45] Date of Patent: Aug. 18, 1998

[54] TRANSDUCER SUSPENSION SYSTEM HAVING BOSSES WITH DIFFERENT INNER DIAMETERS, AND EQUAL OUTER DIAMETERS

[75] Inventors: Akihiko Aoyagi, Fujisawa; Mutsuro Ohta, Ebina; Nobuyuki Hashi; Hitoshi Tsujino, both of Fujisawa, all of Japan

[73] Assignee: International Business Machines Corporation, Armonk, N.Y.

[21] Appl. No.: 890,175

[22] Filed: Jul. 9, 1997

Related U.S. Application Data

[63] Continuation of Ser. No. 575,765, Dec. 20, 1995, abandoned.

[30] Foreign Application Priority Data

Jan. 11, 1995 [JP] Japan ................................ 7-002765

[51] Int. Cl.⁶ ........................................... G11B 21/16
[52] U.S. Cl. ............................................ 360/104
[58] Field of Search ............................ 360/104, 106; 29/603.03

[56] References Cited

U.S. PATENT DOCUMENTS

| | | | |
|---|---|---|---|
| 4,829,395 | 5/1989 | Coon et al. | 360/104 |
| 4,991,045 | 2/1991 | Oberg | 360/104 |
| 5,140,481 | 8/1992 | Cain et al. | 360/104 |
| 5,153,794 | 10/1992 | Hinlein | 360/104 |
| 5,172,286 | 12/1992 | Jurgenson | 360/104 |
| 5,187,626 | 2/1993 | Hopkins et al. | 360/104 |
| 5,262,911 | 11/1993 | Cain et al. | 360/104 |
| 5,508,860 | 4/1996 | Takagi et al. | 360/97.01 |
| 5,546,649 | 8/1996 | Shimanuki | 29/603.03 |

FOREIGN PATENT DOCUMENTS

| | | |
|---|---|---|
| 0438806A2 | 7/1991 | European Pat. Off. |
| 62-298012 | 12/1987 | Japan |
| 5-303855 | 11/1993 | Japan |

Primary Examiner—Craig A. Renner
Attorney, Agent, or Firm—Noreen A. Krall; Douglas R. Millett

[57] ABSTRACT

To attach a suspension assembly to the actuator, the suspension is connected to a mount plate. The inner diameter of the swaging boss in this mount plate differs depending upon if it is on a lower or upper suspension of an actuator arm. After setting only the mount plates with bosses of a larger inner diameter and performing the first swage, the mount plates of the smaller inner diameter are set and a second swage is performed in a different direction. Even when performing this bidirectional swage, a boss caulked with the first swage is subjected to no deformation after a later swage and therefore a stable swage is possible.

8 Claims, 7 Drawing Sheets

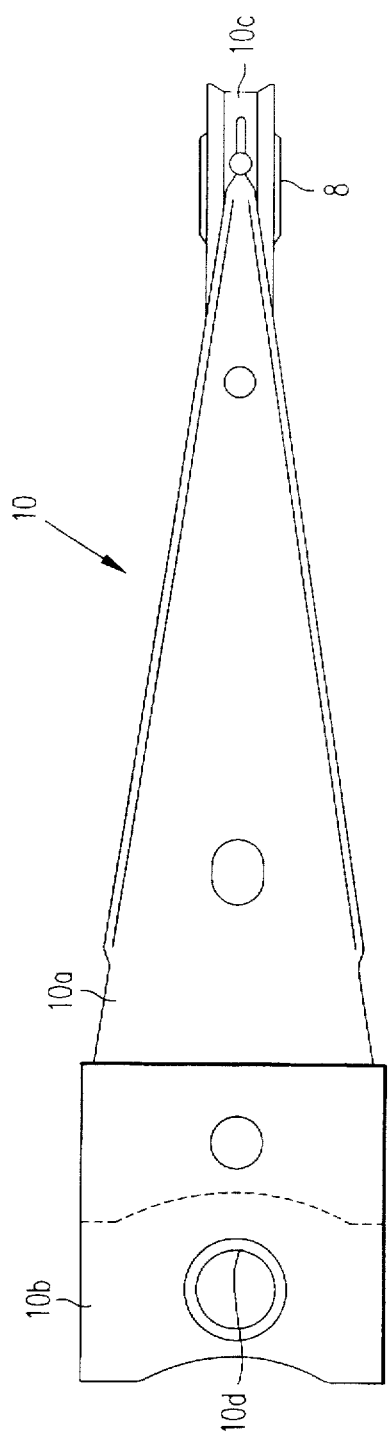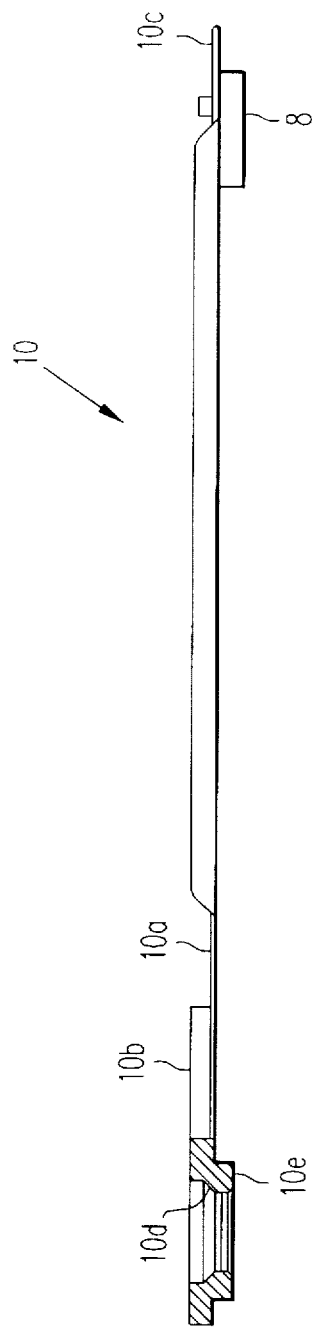
FIG. 2
FIG. 3

TRANSDUCER SUSPENSION SYSTEM HAVING BOSSES WITH DIFFERENT INNER DIAMETERS, AND EQUAL OUTER DIAMETERS

This is a continuation of Ser. No. 08/575,765 filed Dec. 20, 1995, now abandoned.

BACKGROUND OF THE INVENTION

1. Field of Invention

The present invention refers to a disk drive system and more particularly, to a suspension assembly structure and method for attaching a suspension assembled with a signal conversion head on one end to an actuator for positioning the signal conversion head at a predetermined position on the recording surface at the other end.

2. Description of the Prior Art

A magnetic disk drive system has a housing with the environmental factors, such as dust, controlled for accommodating: one or multiple magnetic disks with recording surfaces on both sides; a spin motor for rotating each magnetic disk at a high speed of 1,000 rps; a signal conversion head (transducer) floating on the order of submicrons above the recording surface of a magnetic disk during high-speed rotation for writing data or reading data; and a precision equipment actuator for positioning the signal conversion head to a desired recording track disposed at intervals of submicrons on the recording surface of the magnetic disk. The housing protects all of these elements from the external dusty environment. In view of the generation of heat, ease of connection to the exterior, and space, electronic circuits for controlling the equipment, including one for controlling the write/read of data to/from the magnetic disk via the signal conversion head, one for controlling the movement of an actuator, and one for controlling the spin motor for rotating a magnetic disk, are all located outside of the housing.

In order to achieve a thinner magnetic disk drive system, the goal is to reduce the thickness of the whole housing by developing thinner shaped equipment to go into the housing. In particular, the structure of the attachment between the transducer suspension and the actuator determines the size of the interval between the magnetic disks to be stacked. Furthermore, since a transducer head is disposed above the top layer or below the bottom layer of a magnetic disk, the structure of attaching the transducer suspension to the actuator forms an important factor for determining the overall thickness of the whole housing.

In the past, a swage of, what is called, caulking has often been used to attach the transducer suspension to the actuator. The process of swaging involves pressing and fastening the periphery of a boss to the inner face of a through hole in an actuator arm. The boss is formed in a mount plate of the transducer suspension. The boss is inserted into the through hole formed in the actuator arm. Then, a ball of a little larger size than the inner diameter of the opening of the boss is passed therethrough.

FIGS. 6 to 8 show conventional suspension assembly structures. FIG. 6 shows a structure in which a plurality of suspensions 10 are attached to an actuator 9. The actuator 9 on the attachment side of the mount plates 10b in these suspensions 10 has comb-shaped actuator arms 9a made of Al, on which a plurality of through holes 9b are axially aligned.

The method for attaching this suspension 10 to the actuator 9 will now be described. As shown in FIG. 7, bosses 10c in the mount plate 10b of the suspension 10 are inserted into the respective opening ends in the through holes 9b of actuator arms 9a. The inner diameter of these through holes 9b is larger by a slight degree, e.g., the order of micron, than the outer diameter of bosses 10c. A steel ball 12 of a slightly larger diameter than the inner diameter of a boss 10c is pressed into the through hole 10d of an upper mount plate 10b, penetrates down through the through hole 9b of an actuator arm 9a, and goes out from the through hole 10d of a lower mount plate 10b. At this time, the upper and lower bosses 10c are enlarged and their outer faces are fastened by pressure to the inner face of the through hole 9b of the actuator arm 9a for fixation.

As shown in FIG. 8, if this manipulation is simultaneously made to other through holes 9b of the actuator arm 9a for a multiple suspension assembly structure, a plurality of suspensions 10 can be attached to the actuator 9 at one time.

There are both monodirectional and a bidirectional swage processes. A monodirectional swage process is performed by passing a ball from the UP position to the DOWN position in a downward direction only once while setting suspensions on the upper and lower surfaces of the actuator arm. A bidirectional swage process is performed by passing a ball from the DOWN position to the UP position in an upward direction while setting the suspensions on the lower surfaces of the actuator arm after performing a swage from the UP position to the DOWN position in a downward direction while setting the suspensions only on the upper surfaces of the actuator arm. The bidirectional swage is advantageous in that each suspension is subjected to a uniform deformation of caulking but has also the defects described later.

This suspension swaging assembly structure is made by penetrating a ball through the opening of a boss and has a problem in that a change in the shape of the boss occurs with the penetration, resulting in a change in the load of a head suspension assembly (HSA). A change in the load of a HSA brings about a change in the flying height of the transducer slider. There are problems in that a greater flying height of a slider makes it impossible to read or write a signal on the disk, whereas a lower flying height of a slider brings about a danger of contact between the disk and transducer, thereby shortening a life of the disk drive system. At present, there is no method for evading these problems completely, however, as a current countermeasure there is a method for predicting a change in the load due to a swage and adding a regulating load corresponding to this predicted change in load during the manufacturing step of head suspension assembly.

When attaching a suspension to both sides of the actuator arm, a bidirectional swage is often performed in which, after fixing a first suspension on a first surface of the actuator arm by performing a swage fixation by penetrating a ball through the actuator arm, a second suspension is fixed on a second opposed surface of the actuator arm and a ball is penetrated through the actuator arm from the opposite direction for swage fixation. In this case, two steps of swaging are performed on the first suspension and one step of swaging on the second suspension and so a change in load attributed to the swage process differs with the individual suspensions. It is difficult to regulate a change in load by the above-mentioned prediction of a change in load and so the regulation of this change in load is regarded as difficult.

Examples of transducer suspensions include U.S. Pat. No. 5,262,911 issued Nov. 16, 1993 to Cain et al; U.S. Pat. No. 5,172,286 issued Dec. 15, 1992 to Jurgenson; U.S. Pat. No. 4,991,045 issued Feb. 5, 1991 to Oberg; U.S. Pat. No.

5,140,481 issued Aug. 18, 1992 to Cain et al; U.S. Pat. No. 4,829,395 issued May 9, 1989 to Coon et al and JP 62-298012 filed Jun. 17, 1986.

SUMMARY OF THE INVENTION

It is one object of the present invention to solve the above problems of a conventional method for attaching a suspension to an actuator and provide a stable structure for attaching a suspension to an actuator.

It is a more particular object of the present invention to provide a structure for attaching a suspension to an actuator that enables a stable attachment in a structure for attaching suspensions to both sides of an actuator arm.

It is yet another object of the present invention to provide a swaging structure and process for attaching a suspension to an actuator that enables a reduced change in load of the suspension.

Briefly, in a preferred embodiment, the present invention comprises a disk drive system, comprising a transducer suspension assembled with a transducer head for writing/reading data to/from the recording surface on one end and an actuator for attaching the other end of said suspension thereto and positioning said head at a desired position on said recording surface. The suspension is connected to a boss, having an opening formed therein, which is inserted into an opening formed into an actuator arm portion of said actuator. The suspension is then attached to said actuator arm with swaging.

The inner diameter of an opening formed in a boss for swaging on a first surface of an actuator arm is greater than the inner diameter of a boss on a second opposing surface of the actuator arm. The bosses for swaging are formed on a mount plate connected and fixed to each suspension. The openings in each actuator arm are a plurality of through holes axially aligned and a suspension is attached to each of the plurality of openings in these through holes.

The method for attaching a suspension to an actuator comprises the steps of: inserting a first boss, having an opening of a first inner diameter formed into the end of a first suspension, into an opening formed on a first face side of an actuator arm, passing a first ball having a slightly larger diameter than said first inner diameter through the first boss of said first diameter to fix said first suspension to said actuator arm; inserting a second boss, having an opening of a second inner diameter, smaller than a first diameter, formed into the end of a second suspension, into an opening formed on a second face opposite a first face of an actuator arm, and passing a second ball having a slightly larger diameter than said second inner diameter through the second boss of said second diameter to fix said second suspension to said actuator arm.

Another method for attaching a suspension to an actuator in a configuration wherein two or more actuator arms having openings axially aligned comprises the steps of: inserting a first boss, formed into the end of said first suspension, into openings of a first face in each of said plurality of actuator arms and passing a first ball of said first diameter through openings of said plurality of first bosses to fix a plurality of first suspensions; and inserting a second boss, formed into the other end of a second suspension, into openings of a second face, opposite the first face, in each of said plurality of actuator arms and passing a second ball of said second inner diameter through openings of said plurality of second bosses to fix said plurality of second suspensions.

As an application of the present invention to a mount plate incorporated construction, a method for attaching a suspension to an actuator comprises the steps of: connecting a first suspension to a first mount plate having a first boss of a first inner diameter for fixation, connecting a second suspension to a second mount plate having a second boss of a second inner diameter smaller than the first inner diameter for fixation; inserting a first boss of the first mount plate, to which the first suspension is connected and fixed, into an opening formed on a first face side of an actuator arm; passing a first ball of a slightly larger diameter than said first inner diameter through the first boss of said first diameter to fix said first suspension to said actuator arm; inserting a second boss of the second mount plate, to which the second suspension is connected and fixed, into an opening formed on a second face, opposite the first face, of the actuator arm; and passing a second ball of a slightly larger diameter than said second inner diameter through the second boss of said second diameter to fix said second suspension to said actuator arm.

A further method for attaching a suspension to an actuator in a configuration wherein two or more actuator arms having openings axially aligned are formed on the actuator, comprising the steps of: inserting a first boss of the mount plate, to which the first suspension is connected and fixed, into an opening formed on one face of said plurality of actuator arms; passing a first ball of said first inner diameter through openings of said plurality of first bosses to fix a plurality of first suspensions; inserting a second boss of the second mount plate, to which the second suspension is connected and fixed, into openings of faces opposite the fixed face of the said first suspension for each of said plurality of actuator arms and passing a second ball of said second inner diameter through the openings of said plurality of second bosses to fix said plurality of second suspensions.

According to the structure and method for attaching a suspension to an actuator as set forth in the present invention, a stable structure for attaching the suspension to the actuator is enabled.

Furthermore, a reduction in the change in load is achieved in this method for attaching the suspension to the actuator.

For a fuller understanding of the nature and advantages of the present invention, reference should be made to the following detailed description taken in conjunction with the accompanying drawings.

BRIEF DESCRIPTION OF THE DRAWINGS

FIG. 2 is a plan view of a suspension according to this embodiment;

FIG. 3 is a front view partly in section of a suspension according to this embodiment;

DESCRIPTION OF THE PREFERRED EMBODIMENTS

Figure 1:
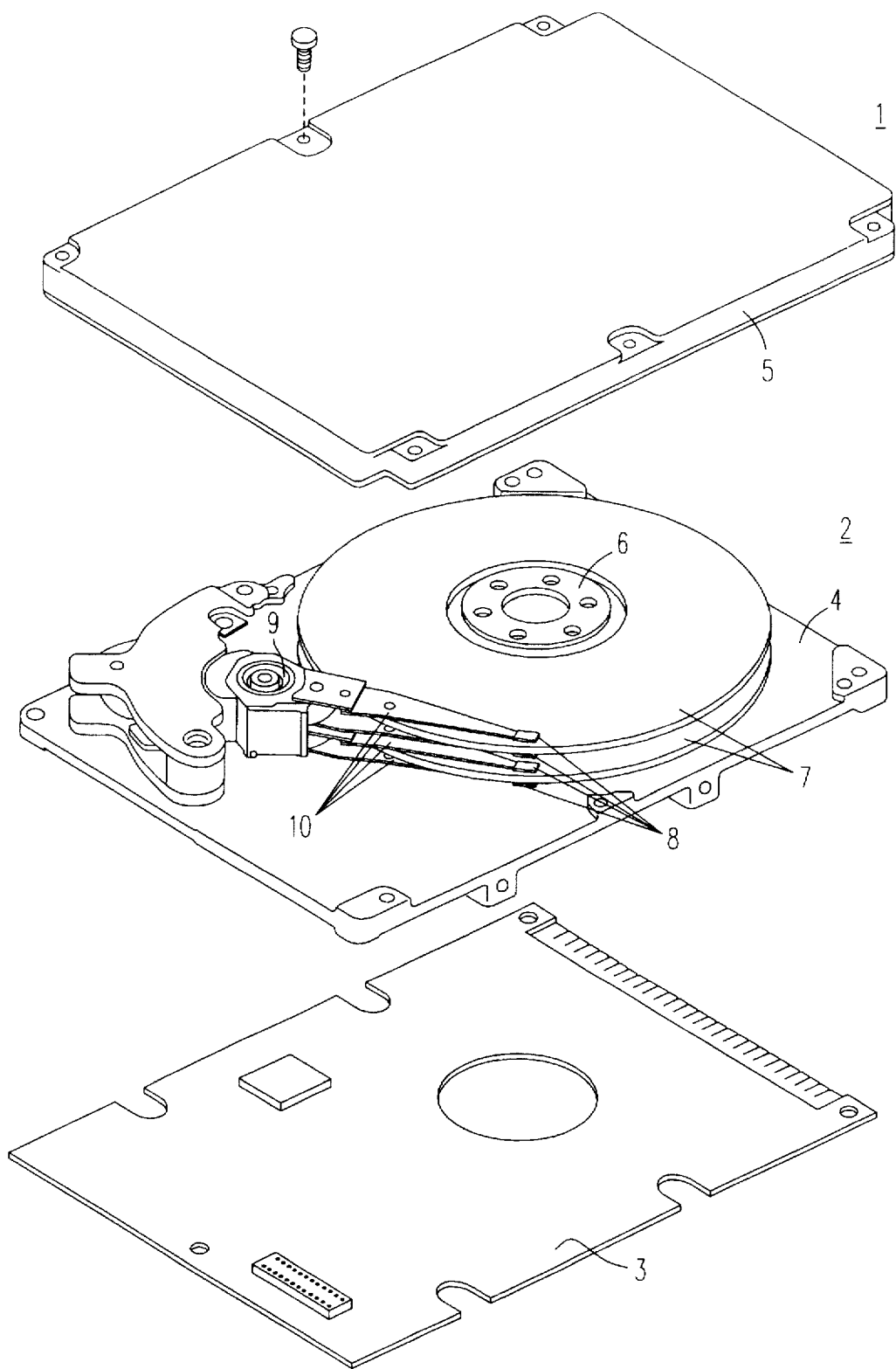
FIG. 1 is a perspective view of a magnetic disk drive system according to one embodiment of the present invention.

FIGS. 1 to 5 show one embodiment of the present invention. First, referring to FIG. 1, a description will be made. The magnetic disk drive system 1 has a housing 2 and a card 3 with an electronic circuit attached to the bottom thereof for control. The housing 2 comprises a base board 4 and a cover 5. In the housing 2 there is a spin motor 6 supported on the base board 4, a plurality of magnetic disks 7 to be rotated with the spin motor 6, a slider 8 having transducer heads for writing or reading data from or to recording surfaces of the magnetic disks 7 and facing each recording surface of the magnetic disks 7, a plurality of suspensions each with a respective slider 8 attached to a first end of each suspension, and an actuator 9 attached to a second end of each of suspensions 10. The actuator 9 is rotatable supported on the base board 4 for positioning each head at a desired track on the recording surface of a magnetic disk 7. The base board 4 and cover 5 can be sealed and form a dust-control environment isolated from the exterior in the housing 2. The exterior and the interior of the housing 2 are connected through a breather filter (not shown) in such a manner that no pressure difference occurs.

In order to reduce the thickness of the whole magnetic disk drive system 1, it is necessary that the housing be very thin and accordingly all equipment to be accommodated in the housing 2 must be as thin as possible. As easily understood, a structure for attaching a transducer suspension 10 to the actuator 9 determines the width of the gap between the magnetic disks 7 and further determines the top and bottom limits of equipment in the housing 2 because the suspensions 10 are disposed above the top layer and below the bottom layer of magnetic disks 7. For this reason it is important to reduce the thickness of the suspension assembly structure in order to reduce the thickness of the whole magnetic disk drive system 1. Furthermore, a certain degree of rigidity must be maintained in this suspension assembly structure in order to have a high rate of access of the heads to the tracks on the disks and so the attachment portion cannot be extremely thin. In addition, ease of assembly is also required.

FIGS. 2 and 3 show a suspension 10 having the suspension assembly structure according to the present invention. A suspension 10 comprises a stainless steel load beam 10a of substantially triangular shape and having a stainless steel mount plate 10b, which is attached to the base part of the load beam 10a by spot welding. To the tip part of the load beam 10a, a slider 8 assembled with a signal transducer head is attached via a stainless steel flexure 10c attached by spot welding. The slider 8 is located proximate to the recording surface of a magnetic disk. Near the center of a mount plate 10b, a through hole 10d is provided. A cylindrical boss 10e is attached to the rim of the through hole 10d on the same side of the load beam 10a as the slider 8.

Figure 4:
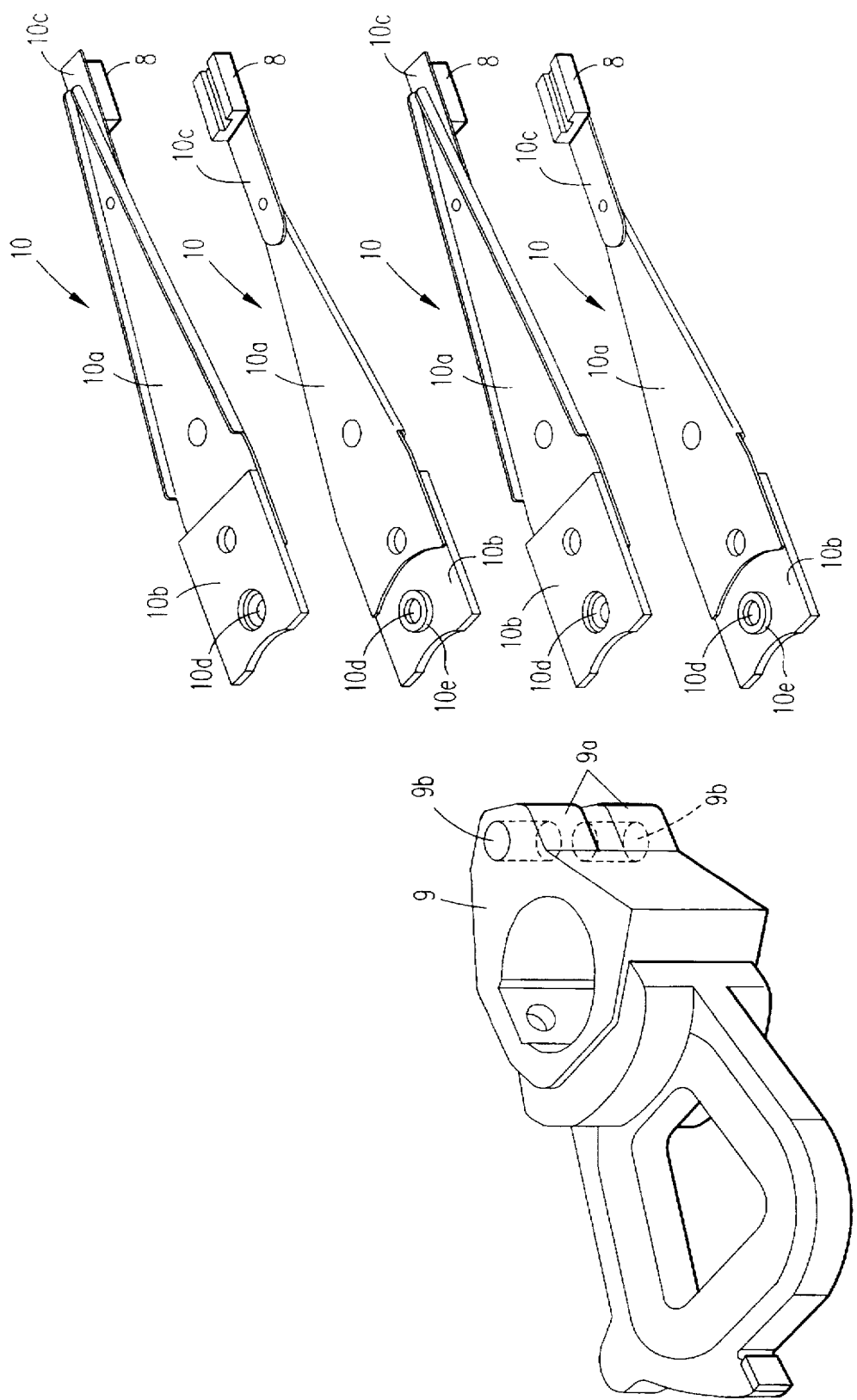
FIG. 4 is a perspective view illustrating a suspension assembly structure according to this embodiment.

The actuator 9 has an Al actuator arm 9a of comb section as shown in FIG. 4, and a plurality of through holes 9b are axially aligned on this actuator arm 9a. The inner diameter of these through holes 9b is slightly, e.g., about several microns, larger than the outer diameter of the boss 10e.

Figures 5A, 5B:
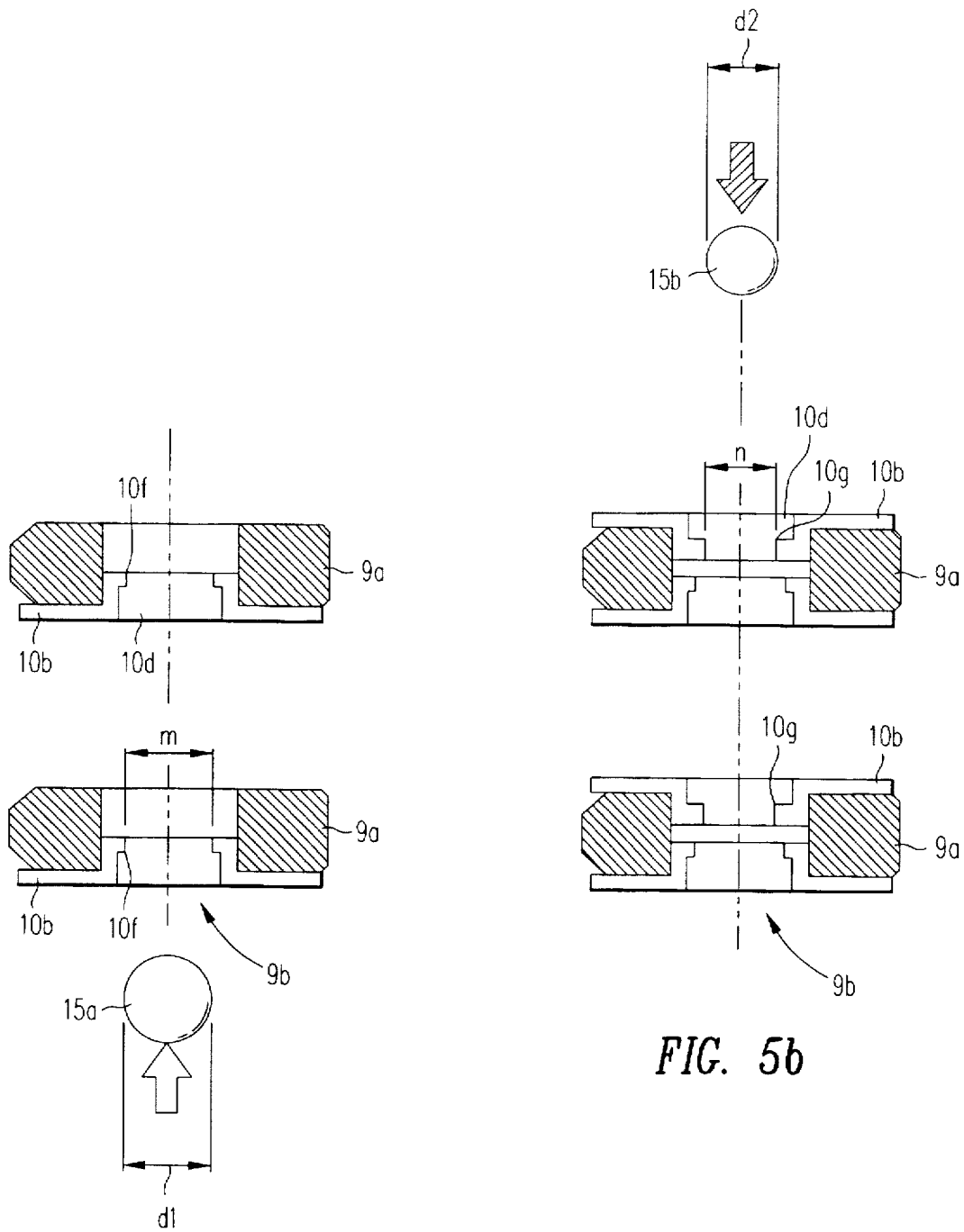
FIGS. 5a and 5b are sectional views illustrating a suspension assembly method according to this embodiment.

The method for attaching the suspension 10 to an actuator 9 will now be described. In each opening end of the through hole of an actuator arm 9a, as shown in FIG. 5(a), a boss 10f of the mount plate 10b is inserted into one face of the through hole 9b. The inner diameter of the boss 10f of this mount plate 10b is m. From the through hole 10d in the mount plate 10b, a steel ball 15a of a diameter d1, which is a slightly larger diameter than the inner diameter m of the boss 10f, is pressed in the direction from DOWN to UP. The ball penetrates the through hole 9b in the actuator arm 9a, and goes from the through hole 10d. At this time, the boss 10f is expanded, the outer surface is fastened by pressure to the inner surface of the through hole 9b in the actuator arm 9a, and the boss 10f is fixed.

See FIG. 5(b). Next, on another face of the through hole 9b, a boss 10g in the mount plate 10b of the suspension 10 is inserted. Bosses 10f and 10g both have the same outer diameter (substantially equal) although their inner diameters are different. The inner diameter of the boss 10g in the mount plate 10b is n and n<m. From the through hole 10d in the mount plate 10b, a steel ball 15b of a diameter d2, which is a slightly larger diameter than the inner diameter n of the boss 10g, is pressed in the direction from Up to DOWN, penetrates the through hole 9b in the actuator arm 9a, and goes through hole 10d. At this time, the boss 10g is expanded, the outer surface is fastened by pressure to the inner surface of the through hole 9b in the actuator arm 9a, and the boss 10g is fixed.

According to this assembly structure and method, the diameter d2 of ball 15b is small enough to apply no pressure to the mount plate caulked by the first time penetration of ball 15a and so the mount plate caulked at the first time generates no deformation due to the second penetration of ball 15b. This is because d2<m. Thus, the mount plate caulked at the first time generates no change in load. In the preferred embodiment n<d2 <m<d1.

Figure 6:
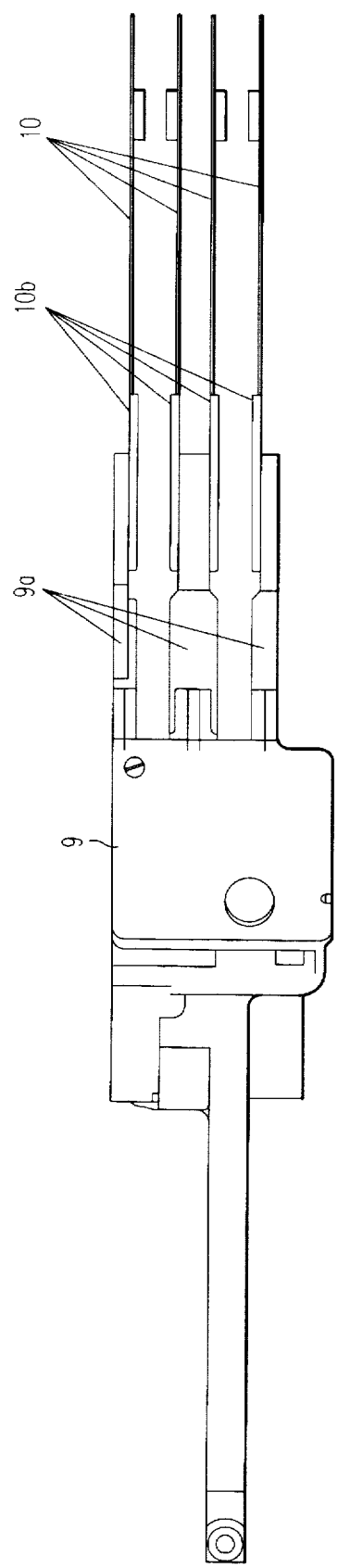
FIG. 6 is a sectional view illustrating a conventional suspension assembly structure.
Figure 7:
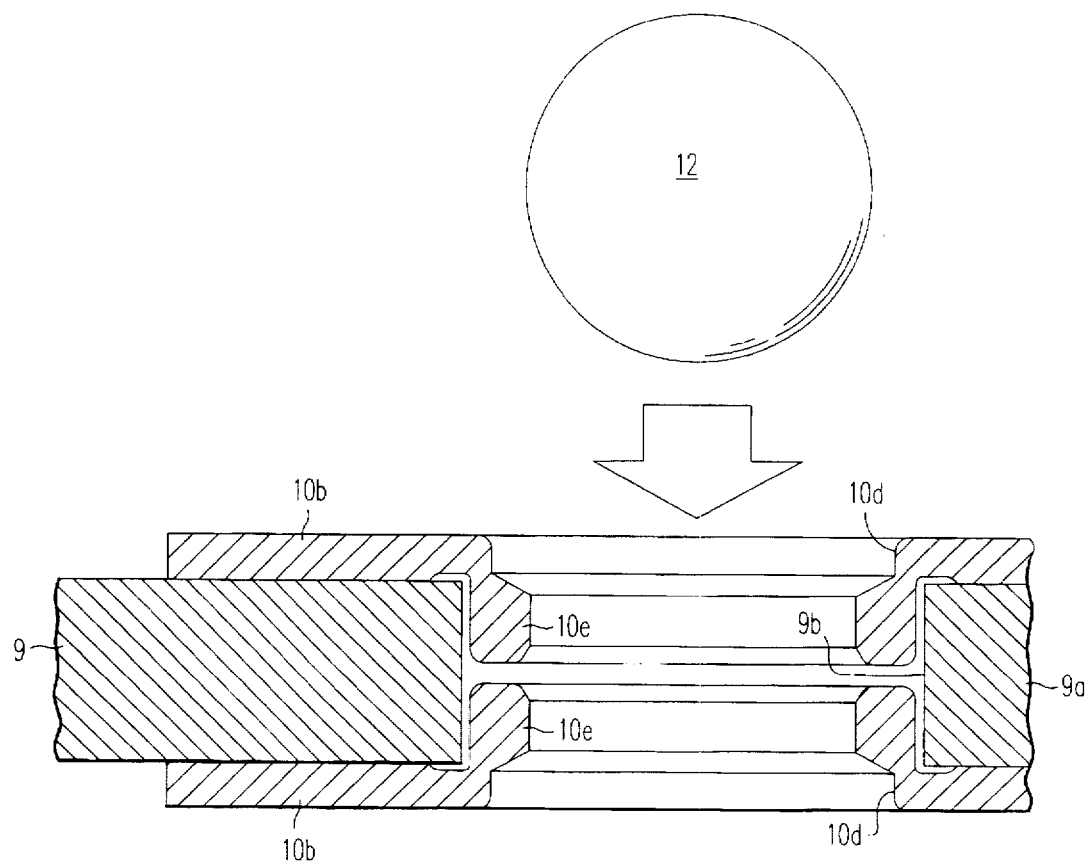
FIG. 7 is a sectional view illustrating a conventional suspension assembly method.
Figure 8:
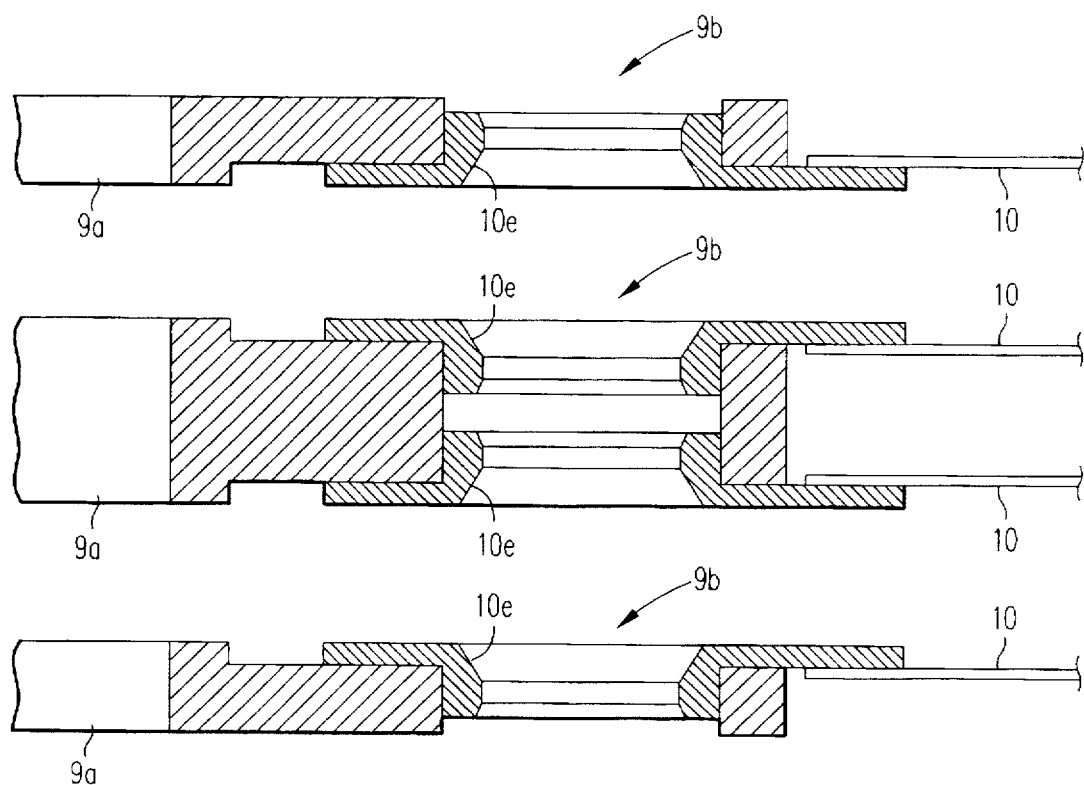
FIG. 8 is a sectional view illustrating a conventional suspension assembly structure.

Here, description is made referring to the configuration having a structure in which opposed sliders 8 are attached with the actuator arm sandwiched therebetween as shown in FIG. 4, however, the present invention is not limited to such a structure but is also applicable to the structure in which opposed sliders are attached to the opposed faces of the actuator arm as shown in FIG. 6.

Thus, in a structure for attaching a plurality of suspensions to the actuator by swaging, the present invention makes it possible to suppress the variance of changes in load with swage and to suppress the change in the flying height of a slider, so that a fall in the read/write characteristic of a magnetic disk is prevented, thereby enabling a stable attachment of suspensions to the actuator.

While the preferred embodiments of the present invention have been illustrated in detail, it should be apparent that modifications and adaptations to those embodiments may occur to one skilled in the art without departing from the scope of the present invention as set forth in the following claims.

We claim:

1. A transducer suspension system comprising:

an actuator arm member having a through-hole formed therein extending along an axis to define first and second opposite openings;

a first boss having a first outer diameter sized to fit within the through-hole, the first boss having a first inner diameter m, the first boss being swage attached within the first opening of the through-hole by a swage tool of a diameter d1;

a first transducer suspension in connection with the first boss;

a second boss having an outer diameter substantially equal to the first outer diameter, the second boss having a second inner diameter n which is less than the first inner diameter m, the second boss being swage attached within the second opening of the through-hole by a swage tool of diameter d2, wherein d2<m, the first and second bosses being located such that neither boss overlaps the other along any plane perpendicular to the axis located at any point along the axis; and a second transducer suspension in connection with the second boss.

2. The system of claim 1, wherein the first and second transducer suspensions are welded to the first and second bosses, respectively.

3. The system of claim 1, wherein the first and second bosses each comprise a flat plate member and a hollow cylindrical member.

4. The system of claim 1, further comprising a second actuator arm member having a third and a fourth transducer suspension and a third and a fourth boss, the third and the fourth boss being the same dimensions as the first and the second boss, respectively.

5. A transducer suspension system comprising:

a data storage disk;

a rotating device for rotating the disk;

an actuator arm member having a through-hole formed therein extending along an axis to define first and second opposite openings;

a first boss having a first outer diameter sized to fit within the through-hole, the first boss having a first inner diameter m, the first boss being swage attached within the first opening of the through-hole by a swage tool of a diameter d1;

a first transducer suspension in connection with the first boss;

a second boss having an outer diameter substantially equal to the first outer diameter, the second boss having a second inner diameter n which is less than the first inner diameter m, the second boss being swage attached within the second opening of the through-hole by a swage tool of diameter d2, wherein d2<m, the first and second bosses being located such that neither boss overlaps the other along any plane perpendicular to the axis located at any point along the axis;

a second transducer suspension in connection with the second boss;

a first transducer attached to the first transducer suspension and being positioned proximate a first surface of the disk; and a second transducer attached to the second transducer suspension and being proximate to a second surface of the disk.

6. The system of claim 5, wherein the first and second transducer suspensions are welded to the first and second bosses, respectively.

7. The system of claim 5, wherein the first and second bosses each comprise a flat plate member and a hollow cylindrical member.

8. The system of claim 5, further comprising a second actuator arm member having a third and a fourth transducer suspension and a third and a fourth boss, the third and the fourth boss being the same dimensions as the first and the second boss, respectively.

* * * * *